United States Patent
Hawkins et al.

(10) Patent No.: US 10,949,230 B2
(45) Date of Patent: Mar. 16, 2021

(54) LANGUAGE LISTS FOR RESOURCE SELECTION BASED ON LANGUAGE TEXT DIRECTION

(75) Inventors: Rylan Michael Hawkins, Seattle, WA (US); Eric Scott Albright, Sammamish, WA (US); Nick Beal, Bothell, WA (US); Peter Geoffrey Constable, Redmond, WA (US); Wade H. Curtiss, Kirkland, WA (US); Erik Fortune, Redmond, WA (US); Andrew Stuart Glass, Seattle, WA (US); Samuel Aaron Beard, Snohomish, WA (US); Microsoft Technology Licensing, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1168 days.

(21) Appl. No.: 13/485,917

(22) Filed: May 31, 2012

(65) Prior Publication Data
US 2013/0325435 A1    Dec. 5, 2013

(51) Int. Cl.
*G06F 16/33* (2019.01)
*G06F 40/40* (2020.01)
(Continued)

(52) U.S. Cl.
CPC .......... *G06F 9/454* (2018.02); *G06F 16/3337* (2019.01); *G06F 16/955* (2019.01); *G06F 40/40* (2020.01); *G06F 40/58* (2020.01)

(58) Field of Classification Search
CPC ............... G06F 17/30669; G06F 17/28; G06F 17/30876; G06F 17/289; G06F 16/951; G06F 40/58
(Continued)

(56) References Cited

U.S. PATENT DOCUMENTS

| 5,923,842 A | 7/1999 | Pedersen et al. |
| 6,064,385 A | 5/2000 | Sturgeon et al. |

(Continued)

FOREIGN PATENT DOCUMENTS

| CN | 1329309 A | 1/2002 |
| CN | 1829261 A | 9/2006 |

(Continued)

OTHER PUBLICATIONS

"First Office Action Issued in Chinese Patent Application No. 201310211732.0", dated Oct. 26, 2015, 17 Pages.
(Continued)

*Primary Examiner* — Farzad Kazeminezhad
(74) *Attorney, Agent, or Firm* — Newport IP, LLC; Benjamin A Keim

(57) ABSTRACT

A device may be configured to enable a user to select a language, and may fulfill resource requests from applications by selecting, from among resources respectively associated with a language, a resource associated with the selected language of the user. However, this resource selection process may be inadequate if the user selects multiple languages; if a resource associated with the selected language of the user is unavailable, but resources associated with related languages are available; or if the user and/or the application specifies an ordering for the selection among the languages. Presented herein are techniques for performing the resource selection by, for respective languages selected by the user, calculating a weight representing a suitability of the language for the resource request; generating a selection order of the selected languages according to the weights; and selecting a resource based on the position of the associated language in the selection order.

20 Claims, 6 Drawing Sheets

(51) Int. Cl.
*G06F 16/955* (2019.01)
*G06F 9/451* (2018.01)
*G06F 40/58* (2020.01)

(58) Field of Classification Search
USPC .................................................. 704/2, 8, 3
See application file for complete search history.

(56) References Cited

U.S. PATENT DOCUMENTS

| | | | |
|---|---|---|---|
| 6,092,036 | A | 7/2000 | Hamann |
| 6,396,515 | B1 | 5/2002 | Hetherington et al. |
| 7,616,764 | B2 | 11/2009 | Varghese et al. |
| 7,634,720 | B2 | 12/2009 | Haluptzok et al. |
| 7,908,645 | B2 | 3/2011 | Varghese et al. |
| 8,209,164 | B2 * | 6/2012 | Etzioni ............... G06F 17/28 704/2 |
| 8,600,993 | B1 * | 12/2013 | Gupta ............. G06F 17/30876 707/709 |
| 8,639,701 | B1 * | 1/2014 | Lim ................ G06F 17/30669 707/748 |
| 9,639,676 | B2 | 5/2017 | Betz et al. |
| 2005/0071686 | A1 | 3/2005 | Bagga et al. |
| 2005/0102253 | A1 | 5/2005 | Wu |
| 2006/0116864 | A1 | 6/2006 | McHugh |
| 2007/0204042 | A1 | 8/2007 | Noble |
| 2008/0082317 | A1 * | 4/2008 | Rosart ............... G06F 17/289 704/8 |
| 2009/0043809 | A1 | 2/2009 | Fakhouri |
| 2009/0049422 | A1 | 2/2009 | Hage |
| 2009/0089263 | A1 | 4/2009 | McHugh |
| 2009/0089325 | A1 | 4/2009 | Bradford |
| 2009/0132233 | A1 | 5/2009 | Etzioni et al. |
| 2009/0183069 | A1 | 7/2009 | Duggan |
| 2009/0287671 | A1 * | 11/2009 | Bennett ................ G06F 16/951 |
| 2010/0180338 | A1 | 7/2010 | Stewart et al. |
| 2010/0217795 | A1 | 8/2010 | Hong |
| 2010/0251227 | A1 | 9/2010 | Arayasantiparb |
| 2011/0231182 | A1 | 9/2011 | Weider et al. |
| 2012/0316860 | A1 * | 12/2012 | Reitan .................. G06F 17/289 704/2 |
| 2013/0179145 | A1 * | 7/2013 | Patel ..................... G06F 40/58 704/3 |
| 2013/0326605 | A1 | 12/2013 | Betz et al. |
| 2017/0300675 | A1 | 10/2017 | Betz et al. |
| 2019/0258784 | A1 | 8/2019 | Betz et al. |

FOREIGN PATENT DOCUMENTS

| | | |
|---|---|---|
| CN | 101169812 A | 4/2008 |
| CN | 101375546 A | 2/2009 |
| CN | 101542428 A | 9/2009 |

OTHER PUBLICATIONS

"Third Office Action Issued in Chinese Application No. 201310211732.0", dated Aug. 30, 2016, 7 Pages.
"Second Office Action and Search Report Issued in Chinese Patent Application No. 201310211732.0", dated Jun. 1, 2016, 21 Pages.
"Non Final Office Action Issued in U.S. Appl. No. 13/485,683", dated Apr. 16, 2014, 11 Pages.
"Final Office Action Issued in U.S. Appl. No. 13/485,683", dated Aug. 7, 2014, 10 Pages.
"Non Final Office Action Issued in U.S. Appl. No. 13/485,683", dated Dec. 19, 2014, 11 Pages.
"Final Office Action Issued in U.S. Appl. No. 13/485,683", dated Apr. 1, 2015, 11 Pages.
"Non Final Office Action Issued in U.S. Appl. No. 13/485,683", dated Oct. 30, 2015, 18 Pages.
"Final Office Action Issued in U.S. Appl. No. 13/485,683", dated Feb. 26, 2016, 12 Pages.
"First Office Action and Search Report Issued in Chinese Patent Application No. 201310213093.1", dated Sep. 1, 2015, 13 Pages.
"Second Office Action Issued in Chinese Patent Application No. 201310213093.1", dated Jun. 1, 2016, 8 Pages.
"Third Office Action Issued in Chinese Patent Application No. 201310213093.1", dated Oct. 28, 2016, 13 Pages.

* cited by examiner

LANGUAGE LISTS FOR RESOURCE SELECTION BASED ON LANGUAGE TEXT DIRECTION

BACKGROUND

In the field of computing, many scenarios involve a computing environment configured to communicate with a user in a natural or artificial language. The selection of a language may alter many aspects of the computing environment, such as the language of texts presented to the user; the types of user interfaces presented to the user (e.g., an on-screen keyboard may present a character set and key layout matching the user's language); and the formats of data presented to the user (e.g., various ways of displaying dates, such as mm-dd-yyyy or dd-mm-yyyy; different units of measurement, such as imperial vs. metric units; and monetary value presented in a local currency).

Language settings may be utilized by many applications, including the operating system of the device, and in many contexts. In particular, a language selected by a user may direct the selection of resources from a resource set. For example, an application may initiate a resource request for a particular resource associated with a language (e.g., a translation or formatting of a string, an image, a video, an audio recording, a date, a measurement, or a currency value), and the device may endeavor to fulfill the resource request by selecting and providing a resource from a resource set that is associated with a language selected by the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The provision of resource requests in view of a language of a user may be complicated for many reasons. As a first example, if a user selects a first language, the resource set may not include a resource that exactly matches the first language, but may include several resources associated with various types of language variants of the selected language (e.g., a generalized language; a variant dialect of the language; a second language with which users who are fluent in the first language are often familiar; and a third language that is often used by individuals in the same region as the first language). As a second example, a multilingual user may specify a set of languages, and the device may be configured to select one resource from the subset of resources in the resource set that match the languages selected by the user. As a third example, among the subset of resources matching the languages specified by the user, respective resources may present a different suitability for the resource request, such as varying degrees of compatibility with the application. As a fourth example, the application may also specify one or more languages that may be advantageously selected for the resource request, and the device may have to mesh the languages selected by the user and the languages requested by the application to choose a language and a corresponding resource.

Presented herein are techniques for configuring a device to select resources from the resource set in response to a resource request that involve several of these considerations. In accordance with these techniques, the device may be configured to, among a set of languages supported by the device, receive from a user a selection of at least one selected language. For respective selected languages, the device may calculate a weight representing a suitability of the language for the resource request, and identify a selection order according to the weights of the selected languages. The device may then present at least one resource in fulfillment of the resource request according to the selection order of the selected languages. Additional variations may also be applied (e.g., adjusting the weights based on a selection logic specified by the application or weight adjustments specified by the user) in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
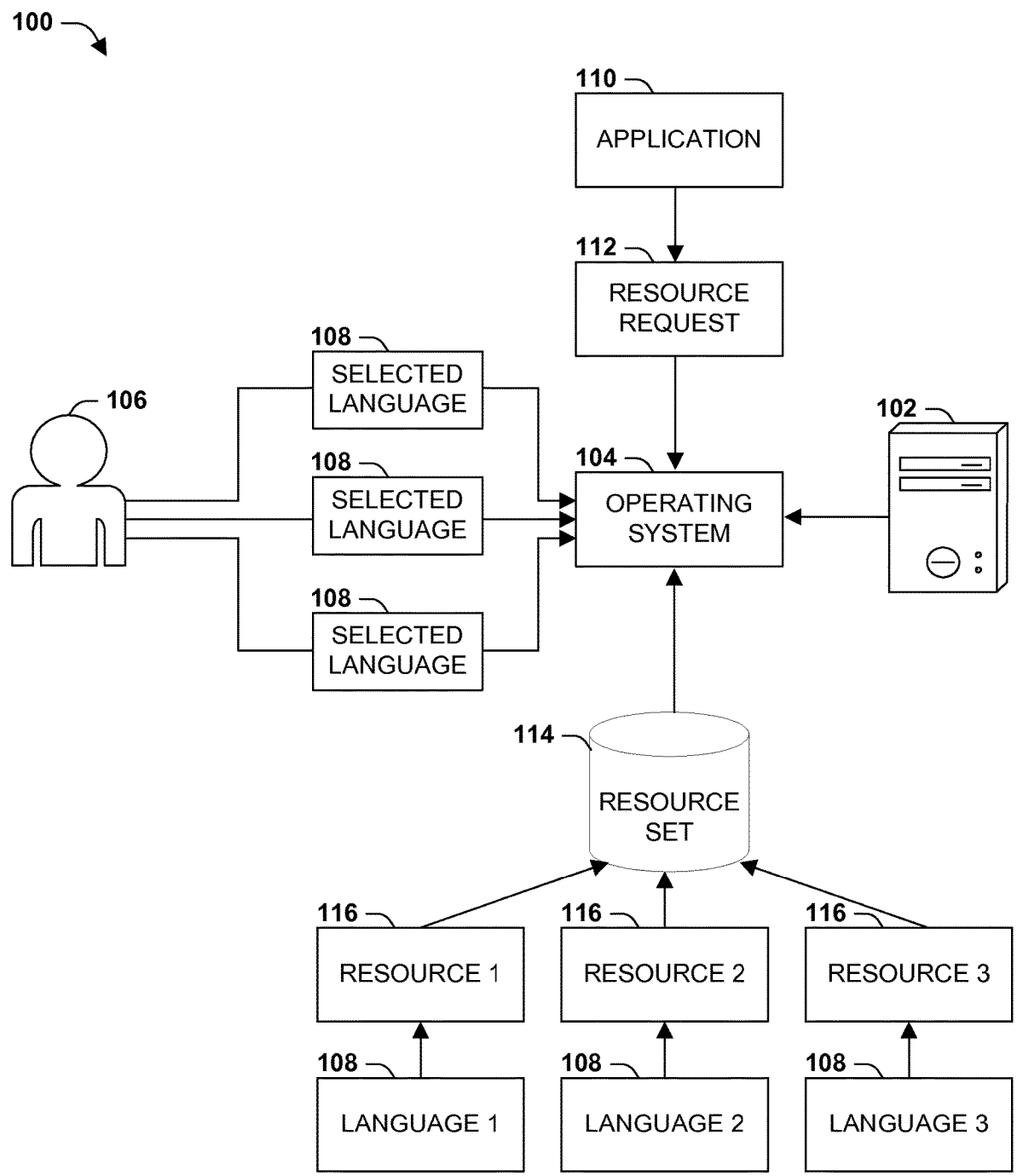
FIG. 1 is an illustration of an exemplary scenario featuring a device configured to select resources from a resource set according to language selection of a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a device that is capable of communicating with a user in multiple languages. For example, a multilingual device may be capable of communicating with users in English, French, and Spanish, as well as regional dialects of these languages (such as American English and UK English), and, upon a user selecting a desired language, may adjust the output and/or parsing input to utilize text in the selected language. Other features of the text may also be adapted, such as a presented direction of text matching the selected language (e.g., horizontal left-to-right, horizontal right-to-left, horizontal bidirectional, and vertical left-to-right). User interfaces may be adapted based on the language selection; for example, the character set and key layout of an on-screen keyboard may reflect the language and cultural standards of a particular language, such as the ANSI mechanical layout for users of American English; the ISO mechanical layout for users of UK English; and the JIS mechanical layout for users of Japanese. Additional features of the device may also be adapted based on the selection, such as the presentation of measurements in metric, imperial, Troy, or other measurement systems; the presentation of value in a currency format associated with the selected language; and the presentation of dates according to the cultural standards associated with the selected language (e.g., the mm-dd-yyyy formatting of dates in the American style, or the dd-mm-yyyy formatting of dates in the UK style).

A device may be configured to enable a user to select a language, and to utilize the selected language throughout the computing environment presented by the device. For example, an operating system of a computer may present a control panel and help documentation in the language selected by the user, and to communicate with the user through user interfaces based on the selected language. Additionally, the device may feature a set of applications that may be installed and executed within a computing environment. These applications may initiate a resource request specifying a particular resource (e.g., a string, an image, a video, an audio recording, a date, a measurement, or a currency value) that may be available in multiple languages. The device may therefore select a suitable resource from the resource set that supports the language selected by the user in order to fulfill the resource request.

FIG. 1 presents an illustration of an exemplary scenario featuring a device 102 comprising an operating system 104 configured to communicate with a user 106 in a selected language 108. The user 106 may specify a language 108 for the operating system 104, and the operating system 104 may respond by using resources corresponding to the selected language 108. Additionally, the device 102 may store a resource set 114 comprising a set of resources 116 that are respectively associated with a language 108. An application 110 may initiate a resource request 112 to the operating system 104 (e.g., a request for a formatting or translation of a text; a conversion or formatting of a data type; or an application programming library that includes communications that may be presented to the user 106), and the operating system 104 may endeavor to fulfill the resource request 112 by selecting a resource 116 associated with one of the languages 108 selected by the user 106. In this manner, the operating system 104 may provide language services to the application 110 with respect to the resource set 114 and the selected languages 108 of the user 106.

While the exemplary scenario 100 of FIG. 1 presents some advantages over other configurations of the device 102, some disadvantages may also arise from this configuration. As a first example, if the user 106 selects several languages 108 that respectively match several resources 116, the operating system 104 may be unable to choose among them in order to provide a resource 116 to fulfill the resource request 112. As a second example, if none of the resources 116 is directly associated with the precise language 108 specified by the user 106, but if resources 116 are associated with related languages 108 (e.g., a different dialect of the same language; a language with which speakers who are fluent in the user's selected language 108 are often also familiar; or a regionally related language 108), the operating system 104 may fail to present one of these related resources 116. As a third example, among several resources 116 matching a language 108 selected by the user 106, respective resources 116 may also vary in other ways, such as a suitability for the resource request 112 (e.g., varying degrees of compatibility with the application 110), but the operating system 104 may not be capable of utilizing this information while selecting a resource 116. As a fourth example, in addition to selecting a language 108, the user 106 may also specify a user order of the languages 108 (e.g., a primary language 108 that is to be selected before a secondary language 108), and/or the application 110 may also specify with the resource request 112 a selection logic to be applied to the resources 116 and associated languages 108, but the operating system 104 may not be configured to adjust the selection of the resources 116 according to this information. These complexities may therefore fail to be considered, and the operating system 104 may select a less desirable resource 116, such as choosing arbitrarily among the resources 116 (such as the first identified resource 116 identified as satisfying the resource request 112) rather than according to a particular logic.

B. Presented Techniques

Presented herein are techniques for configuring a device 102 to receive and apply the selection of languages 108 in a manner that may reduce the disadvantages presented in the exemplary scenario 100 of FIG. 1. In accordance with these techniques, the device 102 may be configured to receive from the user 106 a selection of one or more languages 108, and to choose resources 116 based on the suitability of the selected languages 108 for the resource request 112. For example, when receiving a resource request 112, the device 102 may calculate a weight for respective selected languages 108 that represents a suitability of the language 108 for the resource request 112. The device 102 may then identify a selection order according to the weights of the selected languages 108 (e.g., an order in which the resources 116 are to be selected and presented to fulfill the resource request 112), and to fulfill the resource request 112 by presenting a resource from the resource set according to the selection order of the selected languages 108.

Figure 2:
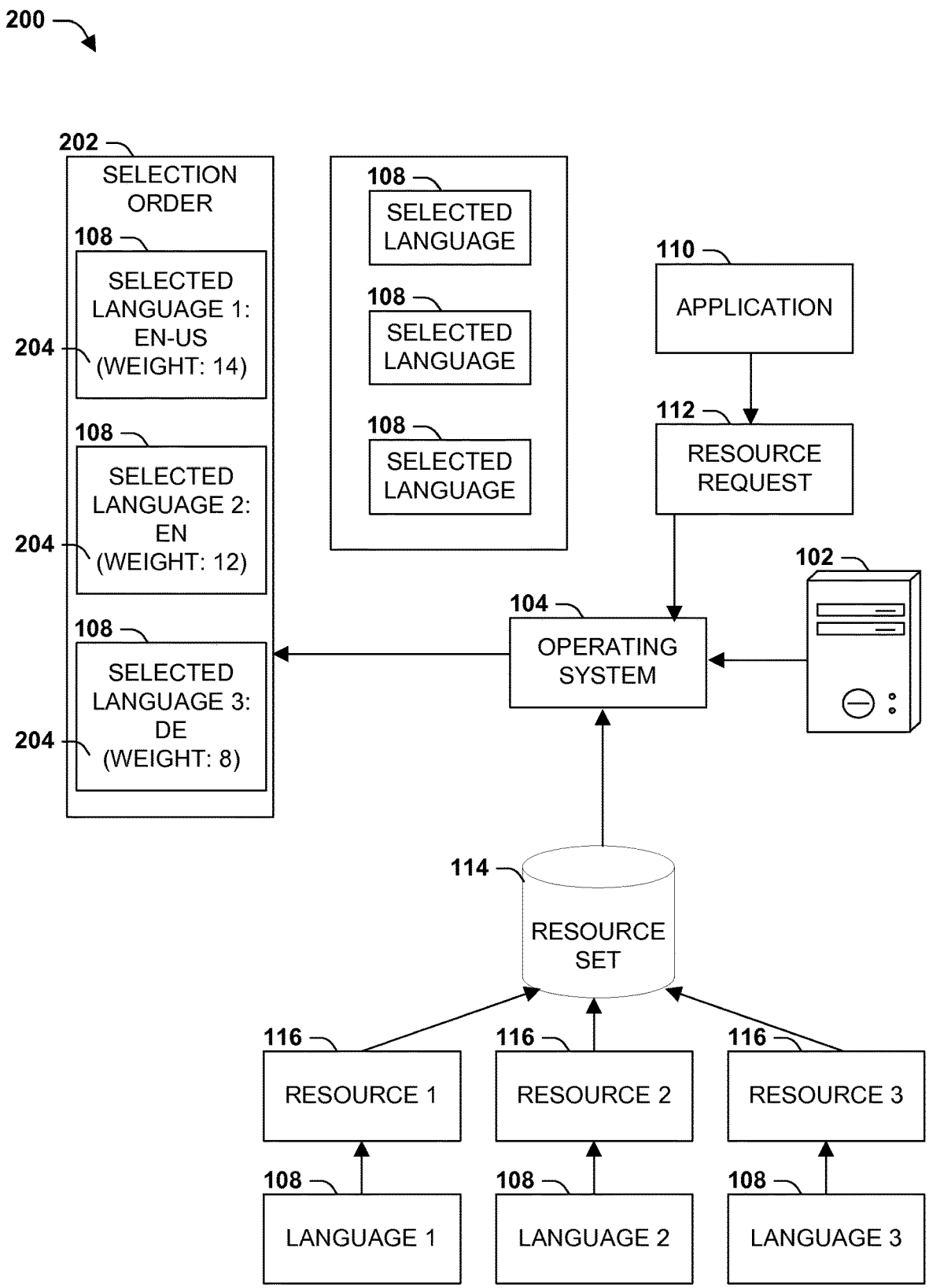
FIG. 2 is an illustration of an exemplary scenario featuring a device configured to select resources from a resource set according to language selections of a user in accordance with the techniques presented herein.

FIG. 2 presents an illustration of an exemplary scenario 200 featuring a device 102 configured to fulfill resource requests 112 by selecting resources 116 in view of a set of selected languages 108 in accordance with the techniques presented herein. In this exemplary scenario 200, the device 102 may store a resource set 114 comprising a set of resources 116 associated with respective languages 108, and an operating system 104 that enables a user 106 to select a set of languages 108 that the user 106 understands. The device 102 may receive a resource request 112 from an application 110, and, as disclosed herein, may select a resource 116 by calculating a weight 204 for each language 108 that represents a suitability of the language 108 for the resource request 112. This calculation may be performed in several ways, and may include other considerations in addition to the suitability of the languages 204 for the resource request 112 (e.g., the proximity of the selected language 108 to a language 108 specified by the application 110; the compatibility of the language with the application 110; or a selection logic specified by the application 110).

The device 102 may then generate a selection order 202 of the languages 108 based on the calculated weights 204, and may utilize the selection order 202 while selecting a resource 116 to provide in fulfillment of the resource request 112. For example, the device 102 may first query the resource set 114 for a resource 116 associated with the first language 108 in the selection order 202 having the highest calculated weight 204, and may provide the resource 116 to the application 110. If such a resource 116 is not available, or if the application 110 indicates that the first resource 116 is not suitable for the resource request 112, then the device 102 may search for and provide a resource 116 associated with the language 108 having the second highest calculated weight 204 in the selection order 202. This selection process may continue until a suitable resource 116 is found that fulfills the resource request 112, or until all of the resources 116 associated with selected languages 108 of the user 106 have been exhausted, whereupon a resource 116 associated with a default language 108 may be presented in order to fulfill the resource request 112. In this manner, the device 102 may present resources 116 to fulfill the resource request 112 based on the languages 108 of the resources 116 and the set of languages 108 selected by the user 106 in accordance with the techniques presented herein.

C. Exemplary Embodiments

Figure 3:
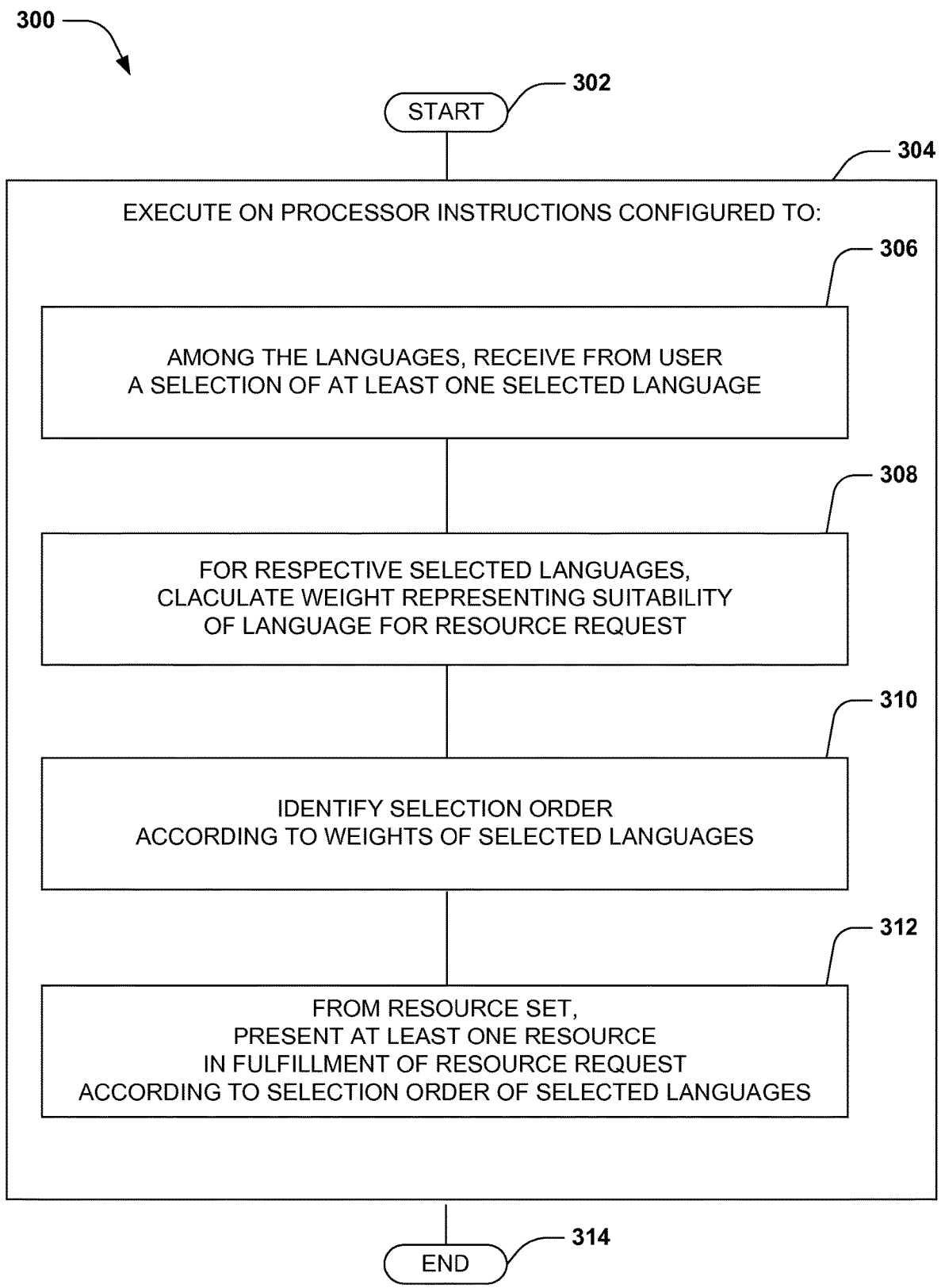
FIG. 3 is a flow chart illustrating an exemplary method of selecting resource from a resource set in accordance with the techniques presented herein.

FIG. 3 presents a first exemplary embodiment of the techniques presented herein, illustrated as an exemplary method 300 of configuring a device 102 to fulfill resource requests 112 for resources 116 respectively associated with a language 108, in view of a selection of languages 108 by a user 106 of the device 102. The exemplary method 300 may be implemented, e.g., as a set of instructions stored in a memory component of the device 102 (e.g., a memory circuit, a platter of a hard disk drive, a solid-state storage device, or a magnetic or optical disc) that, when executed on a processor of the device 102, causes the device 102 to perform the techniques presented herein. The exemplary method 300 begins at 302 and involves executing 304 the instructions on the processor of the device 102. In particular, the instructions are configured to, among the languages 108, receive 306 from a user 106 a selection of at least one selected language 108. The instructions are also configured to, for respective selected languages 108, calculate 308 a weight 204 representing a suitability of the language 108 for the resource request 112. The instructions are also configured to identify 310 a selection order 202 of the languages 108 according to the weights 204 of the selected languages 108. The instructions are also configured to, from the resource set 114, present 312 at least one resource 116 in fulfillment of the resource request 112 according to the selection order 202 of the selected languages 108. In this manner, the exemplary method 300 of FIG. 3 causes the device 102 to fulfill resource requests 112 by selecting resources 116 in view of the selection of languages 108 by the user 106 according to the techniques presented herein, and so ends at 314.

Another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
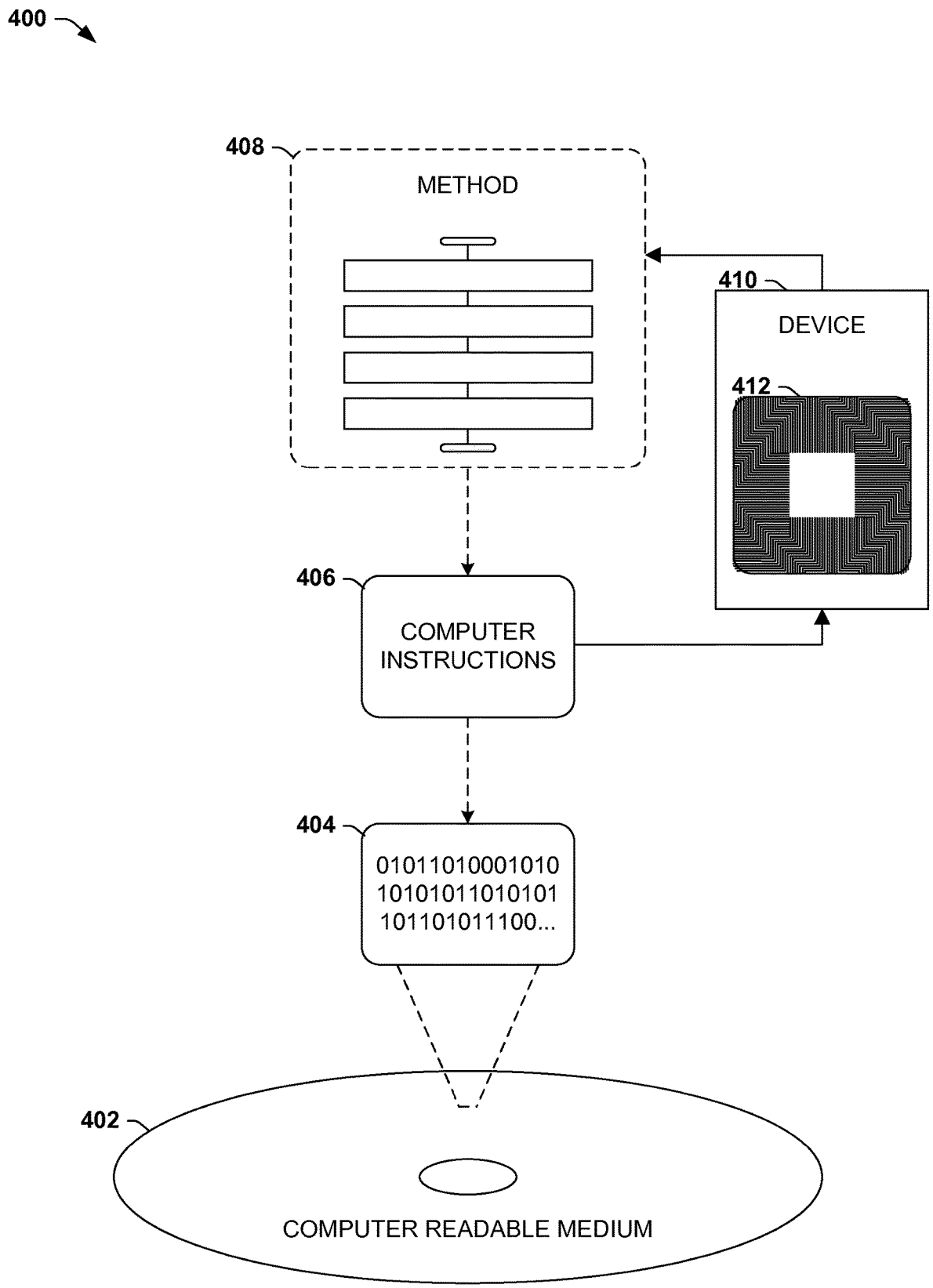
FIG. 4 is an illustration of an exemplary computer-readable medium comprising processor-executable instructions configured to embody one or more of the provisions set forth herein.

An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to the principles set forth herein. Some embodiments of this computer-readable medium may comprise a computer-readable storage medium (e.g., a hard disk drive, an optical disc, or a flash memory device) that is configured to store processor-executable instructions configured in this manner that, when executed on a processor 412 of a device 410, cause the device to perform the techniques presented herein. For example, the processor-executable instructions 406 may be configured to cause the device 410 to perform a method of fulfilling resource requests 112 by selecting resources 116 in view of the selection of languages 108 by a user 106 of the device 102, such as the exemplary method 300 of FIG. 3. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3) to confer individual and/or synergistic advantages upon such embodiments.

D1. Scenarios

A first aspect that may vary among embodiments of these techniques relates to the scenarios wherein such techniques may be implemented.

As a first variation of this first aspect, the techniques presented herein may be applied with many types of devices 102, such as workstations; servers; consoles; and mobile devices such as notebook computers, palmtop computers, mobile phones, portable media players, and portable gaming devices. Additionally, the techniques presented herein may be applied to select a resource 116 from a resource set 114 on behalf of many types of applications 110, such as operating systems; productivity applications, such as text readers and editors; media viewers and editors; games; application development tools; and emulators of other devices and computing environments.

As a second variation of this first aspect, the techniques presented herein may be implemented using various architectures. As a first example, the selection techniques may be implemented by the device 102, by the operating system 104, or by another application 110, or may comprise a standalone application 110 or library that is separately installed on the device 102. As a second example, the selection techniques may be implemented as a hardware component (e.g., a circuit embedded in or inserted into the device 102), a software component that is installed within the computing environment of the operating system 104, or a combination thereof.

As a third variation of this first aspect, the techniques presented herein may be applied to enable users to select among a variety of languages 108. While the examples presented herein utilize naturally arising human languages such as English, French, and German, the techniques may also be adapted to enable the selection of a range of natural and artificial languages usable in a range of contexts such as print, verbal, and gestural communication with other users and/or devices. For example, the concepts presented herein may be applied for the selection of artificially designed languages such as Esperanto; fictional languages such as pirate and Klingon; gestural languages such as American Sign Language and semaphore; tactile languages such as Braille; language encodings such as Morse; and functional languages such as C and Java. The techniques presented herein may enable many such types of selections, and may involve configuring the device 102 to select among the resources 116 in various ways to reflect such decisions.

As a fourth variation of this first aspect, the techniques presented herein may be applied to select among resources 116 of many resource types, such as a text; an image; a video and/or audio recording; a file; an application library or resource, or a data format. These and other scenarios and variations may be compatible with the techniques presented herein.

D2. Language Selection

A second aspect that may vary among embodiments of these techniques involves the manner in which the selection techniques accept a selection of a language 108 from a user 104.

As a first variation of this second aspect, the device 102 may be configured to solicit and/or receive a first selection of a language 108 from the user 106. As a first such example, the device 102 may be configured to present a set of available languages 108 upon detecting a new user 106 of the device 102 (e.g., either the first user 106 to access the device 102 upon activation, or a different user 106 of a device 102 that is already in use by other users 106). As a second such example, the device 102 may identify at least one language 108 as a default language, and may, before receiving a selection of a language 108 from the user 106, utilize the default language as the selected language 108. The default language may be selected, e.g., based on a native language of the manufacturer of the device 102, or a language 108 that is often used in a distribution region where the device 102 is likely to be first utilized. As a third such example, the device 102 may be configured to infer a selection of a language 108 of the user 106 based on various factors. For example, the device 102 may identify a location associated with the user 106 (e.g., through a selection by the user 106 of his or her home location, or through a user profile of the user 106, such as a social network profile), and to select a language 108 that is associated with the location. As another example, the device 102 may be configured to receive a type of user input from the user 106 (e.g., the user's name, an entry of text, or a speech segment), and to infer a selected language 108 of the user 106 based on the user input (e.g., inferring a user's nationality and native language based on his or her name, or applying a natural-language parser to any input provided by the user 106 to identify the language of the user input).

As a second variation of this second aspect, the device 102 may be configured to permit the user 106 to select a set of multiple languages 104. For example, a multilingual user 106 may indicate several languages 108 in which the user 106 is fluent, and for any particular resource request 112, the device 102 may select any suitable language 108 according to the techniques herein. Alternatively, a user 106 may, while selecting several languages 108, specify that some resources requests 112 are to use a first language 108 rather than a second language 108 (and, optionally, that some other resource requests 112 are to use the second language 108 rather than the first language 108).

As a third variation of this second aspect, the calculation of weights 204 of the selected languages 108, representing the suitability of the languages 108 for the resource request 112, and the generation of the language order 202 of the selected languages 108, may involve many considerations. In particular, the resource request 112 may identify a requested language, and the suitability of respective selected languages 108 may be evaluated as a proximity of the selected language 108 to the requested language 108 of the resource request 112. As a first such example, respective languages 108 may be associated with a geographic region or culture, and the proximity of the selected language 108 with the requested language may a relationship of the geographic region or culture of the selected language 108 and the geographic region or culture of the requested language 108. As a second such example, one selected language 108 may comprise a language variant of the requested language 108 (e.g., a dialect of the requested language 108 as a parent or generalized language, or vice versa; a sibling language 108 or dialect; or a precursor or descendant of the requested language 108), and the proximity may be evaluated as a variant proximity of the language variant to the requested language 108. As a third such example, both the requested language 108 and the selected language 108 may have a proximity with a third language 108 (e.g., sibling languages 108 that are both related to a parent language 108), and the proximity may be evaluated with respect to the proximity of the each language 108 with the third language 108.

Other evaluations of suitability, based on the selected language 108 and a requested language 108 of the resource request 112, may be alternatively or additionally considered. For example, respective resources 116 may be associated with a script (e.g., a language alphabet, writing style, text direction, or other features), and the weights 204 of respective selected languages 108 may be calculated by comparing the script of the selected language 108 with the script of the requested language 108. For example, the resource request 112 may specify a language 108 that is often written horizontally, and the selection may calculate a higher weight 204 for other languages 108 that are also written horizontally over languages 108 that are often written vertically. As another such example, a first selected language 108 may comprising a fallback language for a second selected language 108, and the weight 204 of the first selected language 108 may be calculated in view of the weight 204 calculated for the second selected language 108. Additionally, even if the fallback language has not been selected by the user 106, it may be included in the selection order 202 as a fallback for a selected language 108 (which may not be associated with a resource 116).

As a fourth variation of this second aspect, an application 110 may specify a selection logic that may be applied to the calculation of weights 204 of the selected languages 108 and/or the generation of the selection order 202. The calculation of weights 204 representing the suitability of the selected languages 108 for the resource request 112 may invoke the suitability logic of the application 110. As a first such example, the suitability logic may indicate particular features of respective languages 108 that may present greater or lesser suitability with the resource request 112, such as text direction and the types, sizes, and styles of fonts available for the language 108 associated with the resource 116. As a second such example, the suitability logic may specify a requesting order by the application 110 of respective languages 108 (e.g., specifying a set of languages 108 that are known to be compatible with the resource request 112, and a selection order among the languages reflecting the degree of compatibility), and the weights 204 may be calculated in view of the positions of the selected languages 108 in the requesting order specified by the application 110.

As a fifth variation of this second aspect, the calculation of weights 204 and/or generation of the selection order 202 may be adjusted by the user 106. As a first such example, the user 106 may specify a user order of the selected languages 108 (e.g., an order of the user's fluency in or familiarity with the selected languages 108), and the weights 204 may be calculated in view of the positions of the selected languages in the user order. As a second such example, the user may specify an adjustment request to adjust the weight calculation (e.g., indicating a greater sensitivity to similarities in scripts than in geographic regional proximity). The device 102 may record the adjustment request as a weight calculation adjustment, and may apply the weight calculation adjustment during the calculation of weights 204 to adjust the selection order based on the user's instructions. In particular, the user 106 may specify a weight adjustment for particular resource requests 112 (e.g., while fulfilling resource requests 112 from a particular application 110, or among resources 116 of a particular resource type). The device 102 may compare a request type of a resource request 112 with a request type specified by the adjustment request, and apply the weight calculation adjustment only if the request type of the resource request 112 matches the request type of an adjustment request.

As a sixth variation of this second aspect, the selection order 202 may be more substantially modified by the application 110 and/or the user 106. As a first such example, the user 106 and/or application 110 may specify an override language to be selected for the resource request 112, and the device 102 identify a selection order 202 for the resource request 112 comprising only the override language, or by placing the override language at the top of the selection order 202. As a second example, the application 110 and/or user 106 may specify a default language 108, and the device 102 may, upon failing to identify any resources 116 associated with a language 108 that is suitable for the resource request, identify the selection order 202 comprising only the default language. These and other ways of calculating the weights 204 and generating the selection order 202 of the selected languages 108 may be compatible with the techniques presented herein.

Figure 5:
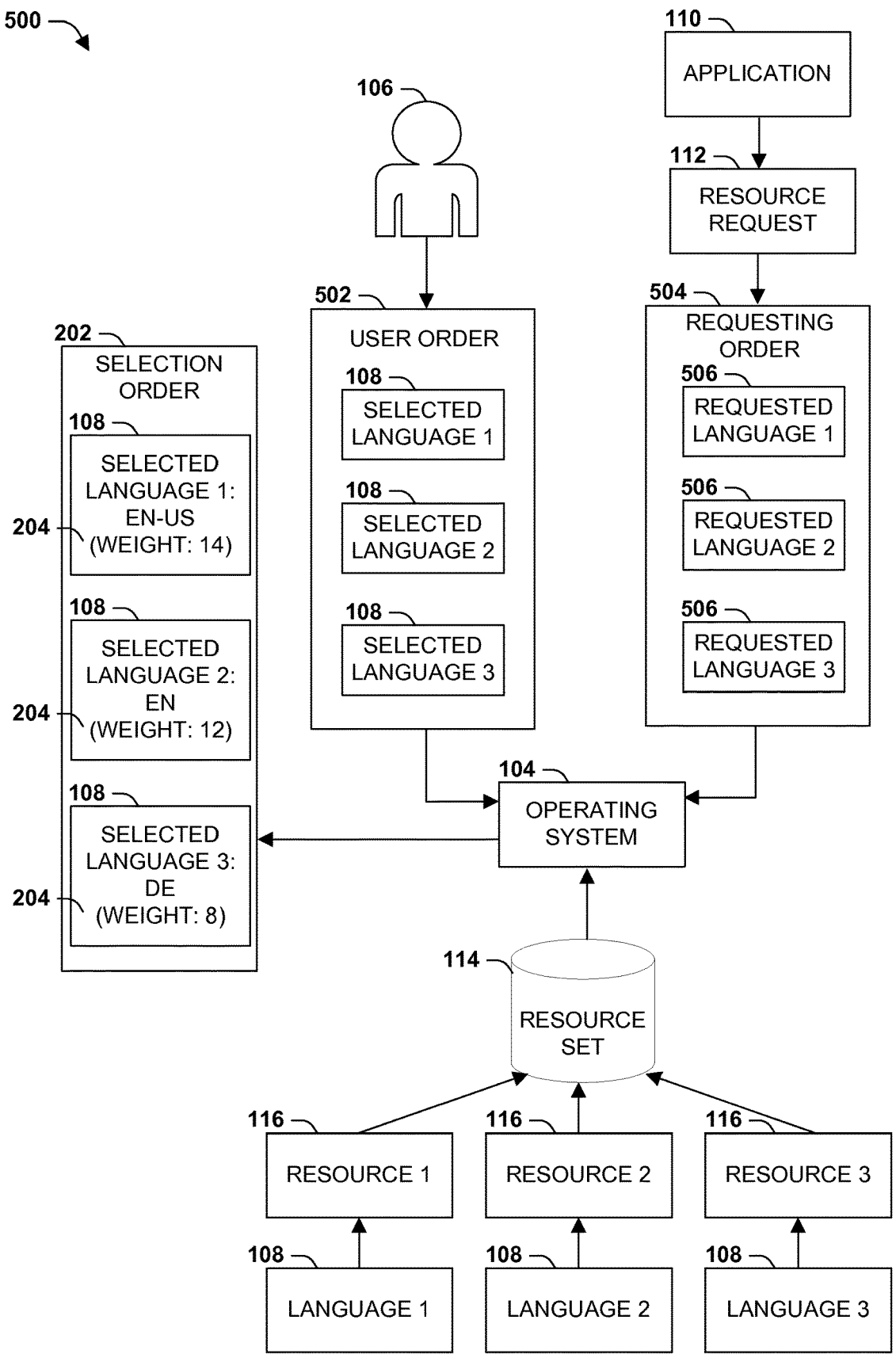
FIG. 5 is an illustration of an exemplary scenario featuring a selection of resources from a resource set in further view of a user order of the languages and a selection logic specified by an application initiating the resource request.

FIG. 5 presents an illustration of an exemplary scenario 500 in which a device 102 having an operating system 104 adjusts the calculation of weights 204 and the generation of the selection order 202 of the languages 108 according to these variations. In this exemplary scenario, the operating system 104 again receives a resource request 112 from an application 110, and endeavors to fulfill the resource request 112 by selecting a resource 116 from the resource set 114 associated with a selected language 108 of a user 106 of the device 102. However, in accordance with these variations, the device 102 may utilize a user order 502 of the selected languages 108 specified by the user 106, and a requesting order 504 of requested languages 506 specified by the application 110 with the resource request 112 while calculating the weights 204 and selecting among the languages 108 and associated resources 116. In this manner, the device 102 may adjust the selection of resources 116 in view of the orderings expressed by the user 106 and the application 110 in accordance with the variations of the techniques presented herein.

E. Computing Environment

Figure 6:
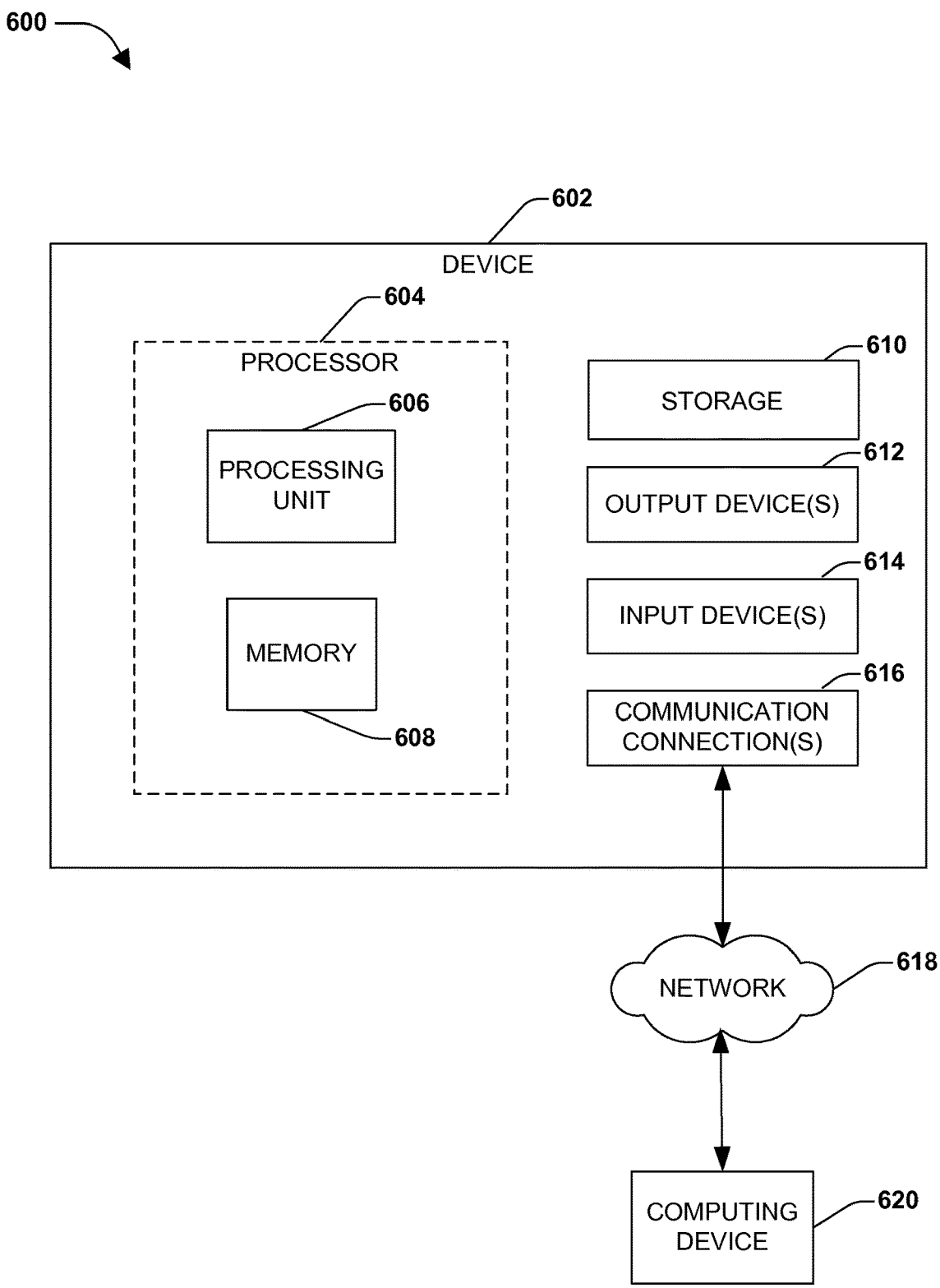
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 602 configured to implement one or more embodiments provided herein. In one configuration, computing device 602 includes at least one processing unit 606 and memory 608. Depending on the exact configuration and type of computing device, memory 608 may be volatile (such as RAM, for example), non-volatile (such as ROM, flash memory, etc., for example) or some combination of the two. This configuration is illustrated in FIG. 6 by dashed line 604.

In other embodiments, device 602 may include additional features and/or functionality. For example, device 602 may also include additional storage (e.g., removable and/or non-removable) including, but not limited to, magnetic storage, optical storage, and the like. Such additional storage is illustrated in FIG. 6 by storage 610. In one embodiment, computer readable instructions to implement one or more embodiments provided herein may be in storage 610. Storage 610 may also store other computer readable instructions to implement an operating system, an application program, and the like. Computer readable instructions may be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media may be part of device 602.

Device 602 may also include communication connection(s) 616 that allows device 602 to communicate with other devices. Communication connection(s) 616 may include, but is not limited to, a modem, a Network Interface Card (NIC), an integrated network interface, a radio frequency transmitter/receiver, an infrared port, a USB connection, or other interfaces for connecting computing device 602 to other computing devices. Communication connection(s) 616 may include a wired connection or a wireless connection. Communication connection(s) 616 may transmit and/or receive communication media.

Device 602 may include input device(s) 614 such as keyboard, mouse, pen, voice input device, touch input device, infrared camera, video input device, gestural device, and/or any other input device. Output device(s) 612 such as one or more displays, speakers, printers, and/or any other output device may also be included in device 602. Input device(s) 614 and output device(s) 612 may be connected to device 602 via a wired connection, wireless connection, or any combination thereof. In one embodiment, an input device or an output device from another computing device may be used as input device(s) 614 or output device(s) 612 for computing device 602.

Components of computing device 602 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 602 may be interconnected by a network. For example, memory 608 may be comprised of multiple physical memory units located in different physical locations interconnected by a network.

Those skilled in the art will realize that storage devices utilized to store computer readable instructions may be distributed across a network. For example, a computing device 620 accessible via network 618 may store computer readable instructions to implement one or more embodiments provided herein. Computing device 602 may access computing device 620 and download a part or all of the computer readable instructions for execution. Alternatively, computing device 602 may download pieces of the computer readable instructions, as needed, or some instructions may be executed at computing device 602 and some at computing device 620.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Additionally, any reference to an application 108 may be applied to the operating system 124 executing on the device 102.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of selecting a resource based on language, the method comprising:
    executing, on a processor of a multilingual device, instructions that cause the multilingual device to:
    receive a user order of at least two languages; and
    fulfill a resource request by an application on the multilingual device for a resource from a resource set that contains resources in a plurality of languages, wherein the resource request specifies a suitability logic indicating a degree of suitability with the application for individual languages based on compatibility with the application of a text direction, a text, or a font associated with the individual languages by:
        for each of the plurality of languages, calculating a weight representing the degree of suitability of the respective one of the plurality of languages for the resource request according to the suitability logic;
        generating, by the multilingual device, a selection order according to weights of the respective ones of the plurality of languages;
        meshing the user order and the selection order to identify, among the languages that are associated with at least one resource of a resource set, a selected language;
        selecting, by an operating system of the multilingual device, a selected resource from the resource set that is associated with the selected language; and
        presenting the selected resource by the application on an output device of the multilingual device.

2. The method of claim 1, wherein:
    the resource request further identifies a requested language; and
    the degree of suitability is further based on a proximity of the selected language to the requested language of the resource request.

3. The method of claim 2, wherein:
    the plurality of languages are each associated with a region; and
    the proximity of the selected language to the requested language further comprises: a relationship of a region of the selected language and a region of the requested language.

4. The method of claim 2, wherein:
    the selected language further comprises a language variant of the requested language; and
    the proximity of the selected language to the requested language further comprises: a variant proximity of the language variant to the requested language.

5. The method of claim 2, wherein:
    the requested language and the selected language have a proximity with a third language; and
    the proximity of the selected language to the requested language further comprises: the proximity of the selected language to the requested language through the third language.

6. The method of claim 2, wherein:
    resources of the resource set are associated with a script; and
    calculating the weight of the respective one of the plurality of languages further comprises: comparing a script of the selected language with a script of the requested language.

7. The method of claim 1, wherein execution of the instructions further causes the multilingual device to select a default language from the at least two languages.

8. The method of claim 7, wherein the default language further comprises a language associated with a distribution region of the multilingual device.

9. The method of claim 1, wherein
    executing the instructions further cause the multilingual device to:
        receive an adjustment request to adjust a weight calculation of a weight for a one of the plurality of languages,
        generate a weight calculation adjustment; and
    calculating the weight further comprises: for the one of the plurality of languages associated with the weight calculation adjustment, calculating the weight of the selected language for the resource request using the weight calculation adjustment.

10. The method of claim 9, wherein:
    the adjustment request further specifies a request type; and
    calculating the weight further comprises:
        comparing a request type of the resource request with the request type of the adjustment request; and
        if the request type of the resource request matches the request type of the adjustment request, calculating the weight of the one of the plurality of languages for the resource request using the weight calculation adjustment.

11. The method of claim 1, wherein the resource that is available in the plurality of languages is selected from a resource type set comprising:
    a text;
    an image;
    a video;
    an audio recording;
    a file; and
    a data format.

12. The method of claim 1, wherein meshing the user order and the selection order further comprises:

for respective ones of the plurality of languages, combining a first order of the language in the user order and a second order of the language in the selection order to produce a meshed order; and identifying the selected language as a language having a highest meshed order among languages available on the multilingual device.

13. The method of claim 1, wherein:

a first language further comprises a fallback language for a second language of the plurality of languages; and calculating the weight of the respective one of the plurality of languages further comprises: calculating the weight of the first language in view of a weight calculated for the second language.

14. The method of claim 1:

the suitability logic comprising a requesting order of languages; and calculating the weight comprises: for the respective ones of the plurality of languages, calculate the weight representing the degree of suitability of the respective ones of the plurality of languages for the resource request according to a position of a language in the requesting order of languages.

15. The method of claim 1, wherein the user order further identifies an override language to select for the resource request, and the method further comprises adjusting the user order for the resource request to comprise only the override language.

16. The method of claim 1, wherein generating the selection order further comprises: responsive to failing to identify at least one language that is suitable for the resource request, set the selection order as only a default language specified by the application.

17. A computer-readable storage device comprising instructions that, when executed on a processor of a multilingual device, cause the multilingual device to select a resource based on language, by:

receiving a user order of at least two languages; and fulfilling, by an operating system of the multilingual device, a resource request by an application on the multilingual device for a resource from a resource set that contains resources in a plurality of languages, wherein the resource request specifies a suitability logic indicating a degree of suitability with the application for individual languages based on compatibility with the application of a text direction, a text, or a font associated with the individual languages by:

for each of the plurality of languages, calculating a weight representing the degree of suitability of the respective one of the plurality of languages for the resource request according to the suitability logic;

generating, by the multilingual device, a selection order according to weights of the respective ones of the plurality of languages;

meshing the user order and the selection order to identify, among the languages that are associated with at least one resource of the resource set, a selected language;

selecting, by the operating system of the multilingual device, a selected resource from the resource set that is associated with the selected language; and presenting the selected resource by the application on an output device of the multilingual device.

18. The computer-readable storage device of claim 17, wherein the instructions further cause the multilingual device to select a resource based on language, by:

receiving an adjustment request to adjust a weight calculation of a weight for a one of the plurality of languages;

generating a weight calculation adjustment; and calculating the weight further comprises: for the one of the plurality of languages associated with the weight calculation adjustment, calculating the weight of the selected language for the resource request using the weight calculation adjustment.

19. A multilingual device that selects a resource based on language, comprising:

a resource set comprising resources in a plurality of languages; and a processor; and a memory storing instructions that, when executed by the processor, cause the multilingual device to:

receive a user order of at least two languages; and fulfill, by operating system of the multilingual device, a resource request by an application on the multilingual device for a resource from the resource set, wherein the resource request specifies a suitability logic indicating a degree of suitability with the application for individual languages based on compatibility with the application of a text direction, a text, or a font associated with the individual languages by:

for each of the plurality of languages, calculating a weight representing the degree of suitability of the respective one of the plurality of languages for the resource request according to the suitability logic;

generating, by the multilingual device, a selection order of the plurality of languages according to weights of respective ones of the plurality of languages;

meshing the user order and the selection order to identify, among the languages that are associated with at least one resource of the resource set, a selected language;

selecting, by the operating system of the multilingual device, a selected resource from the resource set that is associated with the selected language; and presenting the selected resource by the application on output device of the multilingual device.

20. The multilingual device of claim 19, wherein the instructions further cause the multilingual device to:

receive an adjustment request to adjust a weight calculation of a weight for a one of the plurality of languages;

generate a weight calculation adjustment; and calculating the weight further comprises: for the one of the plurality of languages associated with the weight calculation adjustment, calculating the weight of the selected language for the resource request using the weight calculation adjustment.

\* \* \* \* \*